US007260775B2

(12) United States Patent
Christensen et al.

(10) Patent No.: US 7,260,775 B2
(45) Date of Patent: Aug. 21, 2007

(54) SYSTEM AND METHOD FOR DISCOVERING INFORMATION ABOUT WEB RESOURCES

(75) Inventors: Erik B. Christensen, Seattle, WA (US); Henrik Frystyk Nielsen, Seattle, WA (US); Andrew J. Layman, Bellevue, WA (US); Gopal Krishna R. Kakivaya, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 581 days.

(21) Appl. No.: 10/073,670

(22) Filed: Feb. 11, 2002

(65) Prior Publication Data

US 2003/0028528 A1 Feb. 6, 2003

Related U.S. Application Data

(60) Provisional application No. 60/267,902, filed on Feb. 9, 2001.

(51) Int. Cl.
*G06F 17/00* (2006.01)
(52) U.S. Cl. ................................. 715/513; 715/501.1
(58) Field of Classification Search ................ 715/513, 715/501.1; 707/3, 10
See application file for complete search history.

(56) References Cited

U.S. PATENT DOCUMENTS 6,571,248 B1* 5/2003 Kusama ..................... 707/100

6,631,496 B1* 10/2003 Li et al. .................... 715/501.1
6,651,059 B1* 11/2003 Sundaresan et al. ........... 707/6

(Continued)

OTHER PUBLICATIONS

Microsoft Corporation, "Draft: Discovery of Web Services (DISCO)", dated Jul. 2000, downloaded from http://web.archive.org/web/20000815071218/http://msdn.microsoft.com/xml/general/disco.asp, pp. 1-5.*
Tomasic, Anthony, et al, "Improving Access to Enivornmental Data Using Context Information", INRIA Rocquencourt, Mar. 1997.*
XML-dev List Archive, downloaded from http://lists.xml.org/archives/xml-dev/200007/msg00383.html, Jul. 2000.*
Domenig, Ruxandra, et al, A Query Approach for Integrating Heterogeneous Data Sources, ACM 2000, pp. 453-460.*
Omran Bukhres et al.; "Effective Standards for Metadata in the GCMD Data Access System"; Sep. 21-23, 2000; International Symposium on Distributed Objects and Applications; pp. 155-161.

(Continued)

*Primary Examiner*—William Bashore
*Assistant Examiner*—Laurie Ries
(74) *Attorney, Agent, or Firm*—Merchant & Gould P.C.; Ryan T. Grace

(57) ABSTRACT

Described is a system and mechanism by which a client computer may issue a conventional request for a resource on the Web. A response to that request is annotated with information indicating that metadata is available for the resource. Specifically, a special tag or instruction may be included in the response document that indicates the existence and location of a discovery document containing metadata about the resource. The client computer may then retrieve the metadata from the location identified in the response.

21 Claims, 5 Drawing Sheets

U.S. PATENT DOCUMENTS

| | | | |
|---|---|---|---|
| 6,810,382 B1* | 10/2004 | Wamsley et al. | 705/1 |
| 6,895,551 B1* | 5/2005 | Huang et al. | 715/513 |
| 2002/0103829 A1* | 8/2002 | Manning et al. | 707/513 |
| 2002/0103920 A1* | 8/2002 | Berkun et al. | 709/231 |
| 2002/0184401 A1* | 12/2002 | Kadel et al. | 709/315 |
| 2003/0112270 A1* | 6/2003 | Newell et al. | 345/738 |

OTHER PUBLICATIONS

Brian Kelley; "The Evolution of Web Protocols"; Journal of Documentation, Special issue from the United Kingdom Office for Library and Information Networking (UKOLN); Jan. 1999, vol. 55, No. 1; pp. 71-81.

* cited by examiner

201

Content-type text/html

203

*
        *
        *

```
<LINK rel='alternate' type='text/xml'
href='URL2' />
```

205

*
        *
        *

FIG. 2    Response Document A

301

Content-type text/xml

303

*
        *
        *

```
<?xml-stylesheet alternate="yes" href="URL3"
type="text/xml"?>
```

305

*
        *
        *

FIG. 3    Response Document B

```
Content-type text/xml

<x:discovery xmlns:x='http://xmlsoap.org/disco/' />

<d:discoveryref ref='URL5' xmlns:d='http://
xmlsoap.org/disco/' />

<q:soap address='URL6' binding='z:finance'
xmlns:z='http://biz.org/standards' xmlns:q='http://
xmlsoap.org/disco/soap' />

<c:contractRef ref='URL7' docRef='URL8'
xmlns:c='http://xmlsoap.org/disco/' />

<e:schemaRef ref='URL9' xmlns:e='http://xmlsoap.org/
disco/schema' />

</x:discovery>
```

Discovery Document

*FIG. 4*

SYSTEM AND METHOD FOR DISCOVERING INFORMATION ABOUT WEB RESOURCES

REFERENCE TO RELATED APPLICATIONS

The present patent application claims priority from copending U.S. Provisional Patent Application No. 60/267,902, entitled Discovery of Web Services, filed on Feb. 9, 2001, and in the names of Erik B. Christensen, Henrik F. Nielsen, Andrew J. Layman, and Gopal Kakivaya.

FIELD OF THE INVENTION

The present invention relates generally to loosely-coupled networking environments, and, more particularly, to the discovery of information describing resources available at disparate computing systems loosely coupled to a networking environment.

BACKGROUND OF THE INVENTION

The Internet and the World Wide Web are gaining widespread acceptance. Today, users routinely take advantage of a plethora of information and of very many services offered on the Web. So many different individuals, organizations, and entities make information and services available over the Web that it is difficult to easily identify exactly what kind of information or service is being offered. For example, one site may be dedicated to providing different types of information about automobiles or some other item of consumer interest. Unfortunately, there is no simple way for the user to determine what type of information is available at a particular site without manually investigating the site.

In another instance, a company may offer a financial service at its site with a well defined protocol for interacting with the service. If a user wishes to take advantage of the service, the user's computer system most likely must use the defined protocol to communicate with that service. Until now, special services or controls must be installed on the user's computer system before the communication can be made possible. A simple mechanism for making information available about resources that may be found at a site has eluded those skilled in the art.

SUMMARY OF THE INVENTION

The present invention provides a system and method for making metadata available about a Web resource in response to a request to access that resource. Briefly stated, a resource (e.g., a web page or service) pointed to by a Universal Resource Locator (URL) or a Universal Resource Identifier (URI) may have associated metadata. For the purpose of this document, the terms URL and URI have the same meaning, and may be used interchangeably. The metadata describes information about the resource, such as a particular protocol that should be used when communicating with the resource, a type of data that may be represented by the resource, or the like. That metadata may be included within a discovery document stored in association with the resource. If a client computer attempts to get the resource, a response is returned that includes an identification of the discovery document including a pointer to the discovery document. The client computer may then retrieve the discovery document and hence gain the information describing the resource. The use of the discovery document enables the client computer to programmatically determine information about the requested resource in combination with the response to the request for the resource. The discovery document is identified to the client computer automatically in response to the request for the resource, thus reducing any need for special requests by the client computer to determine whether metadata might exist for the resource.

BRIEF DESCRIPTION OF THE DRAWINGS

FIG. 2 is a graphical representation of a first illustrative type of response document that may be returned in response to a request for a resource, in accordance with one embodiment of the invention.

FIG. 3 is a graphical representation of a second illustrative type of response document that may be returned in response to a request for a resource, in accordance with one embodiment of the invention.

FIG. 4 is a graphical representation of an illustrative discovery document that includes metadata about a requested resource.

DETAILED DESCRIPTION OF THE PREFERRED EMBODIMENT

Briefly stated, the present invention makes metadata about a resource available to a client computer in response to a request for the resource. The metadata may be made available to the client computer programmatically so that the user of the client computer need not perform additional steps to gain the metadata. If the resource is requested, a response document is returned to the client computer. Within the response document may be a tag or indication that metadata may be available for the resource and identify where the metadata is located. The client computer may then retrieve the metadata. Embodiments of the invention will now be described to facilitate a better understanding of the invention. However, the invention is not limited to these specific embodiments, but rather is defined only by the scope of the appended claims.

Figure 1:
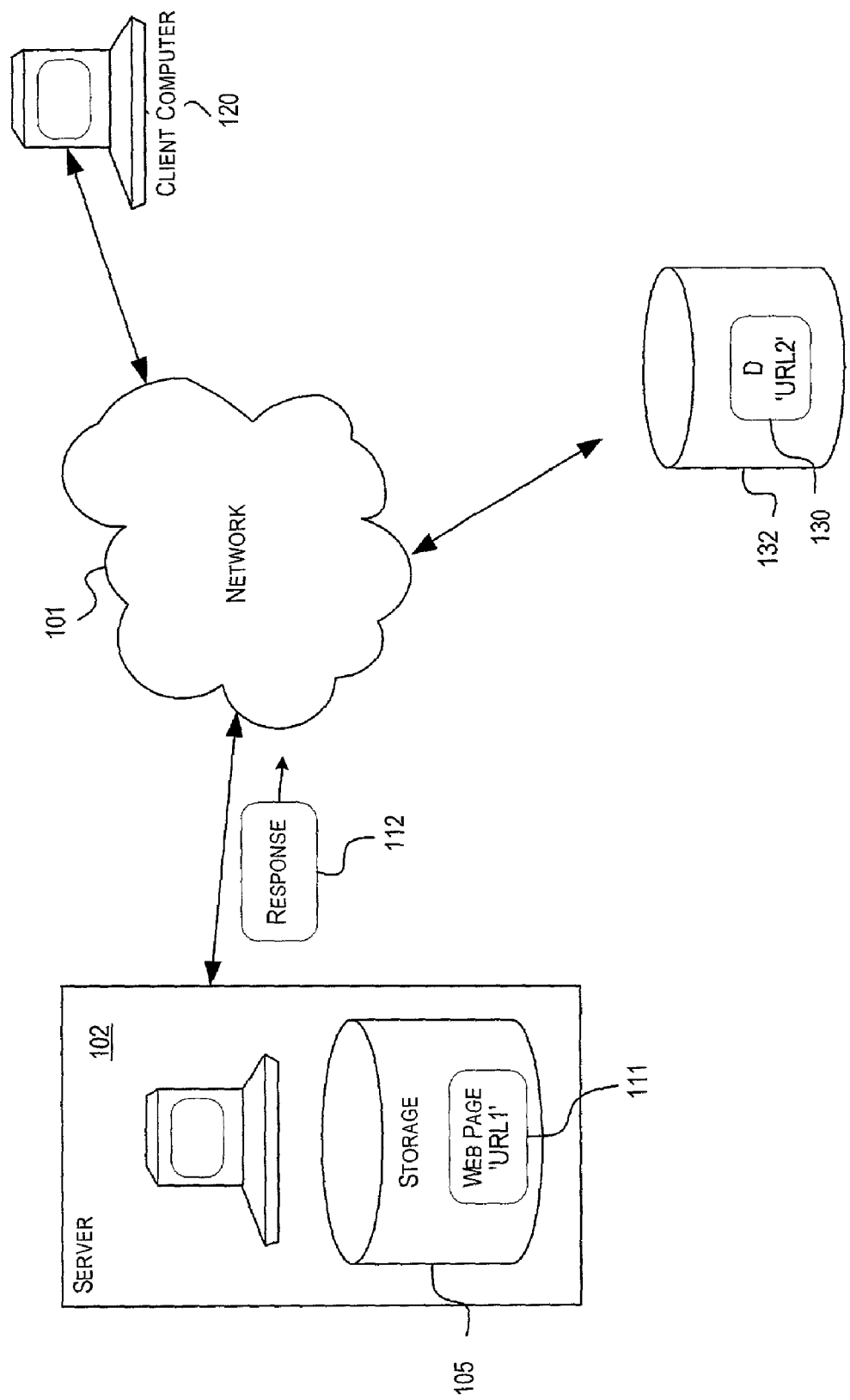
FIG. 1 is a functional block diagram generally illustrating a wide area network for accessing distributed resources including a mechanism for making metadata available about the resources, in accordance with one embodiment of the present invention.

FIG. 1 is a functional block diagram generally illustrating a wide area network 101, such as the Internet, for accessing distributed resources. The wide area network 101 includes a mechanism for making metadata available about the resources. Connected to the wide area network 101 are a server 102 and a client computer 120, which may be typical computing systems of conventional construction. The server 102 and the client computer 120 may be similar to the illustrative computing system described below in conjunction with FIG. 5.

The server 102 may be a conventional Web server configured to make resources available over the wide area network 101. As is typical, the server 102 includes mass storage 105 to contain documents and computer-executable components incident to the tasks of the server 102. In this embodiment, the server 102 makes available resources, such as Web pages, to other computing systems connected to the wide area network 101. The server 102 could equally make available other resources, such as Web-based services or the like. In accordance with convention, the term "resource" is used to mean anything that a Web server may make available over the wide area network. Each resource made available by the server 102 is identified or "pointed to" by a URL.

In short, other devices connected to the wide area network 101 may access resources at the server 102 by issuing a request to the network to retrieve or "Get" the resource identified by a particular URL. The server 102 replies by returning appropriate data in response to the request for the resource. Typically, the appropriate data takes the form of a response document returned to the requesting device. As illustrated in FIG. 1, response document 112 represents the response returned to the requesting device, such as client computer 120.

To illustrate a simple example, consider the following URL: "http://www.microsoft.com/home.htm." This URL points to a Web page, so the response document 112 may be simply the HyperText Markup Language (HTML) text contained within the requested Web page. In a more complex situation, consider the URL "http://www.microsoft.com/service.asp?para=0123." This URL points to an executable file (service.asp) stored within the domain identified by the URL (microsoft.com). In addition, the URL identifies a value (0123) for a parameter (para) that is passed in conjunction with the request for the resource. In this case, the response document 112 is likely not simply HTML text contained within a Web page, but rather, will be a stream of data generated by the identified resource in response to the request. It should be noted that the response document may still be HTML or XML text, but not simply HTML or XML text stored in the requested page.

As illustrated in FIG. 1, the resource 111 stored at the server 102 is pointed to by "URL1." In accordance with the invention, the response document 112 returned to a request to access the resource 111 includes an indication that the resource 111 has associated metadata. The metadata provides information about the resource 111. For example, if the resource were a Web page, the metadata could include information about the author of the Web page, the dates of creation or modification, the general subject area of the Web page, the locations of related Web pages, or any other information that may be of interest to the client computer 120. In another example, if the resource 111 were a service, the metadata could describe a protocol for communicating with the resource 11, formatting data about messages sent to or from the resource 111, or any other information that may be useful to the client computer 120 during communications with the resource 111. In either case, the response document 112 includes some indication that there is metadata available for the resource 111. Although generally described here, the response document 112 and exemplary indications of metadata are described in detail later in conjunction with FIG. 2 and FIG. 3.

The metadata referred to in the response document 112 may be contained within a discovery document 130. The discovery document may be stored at a location identified by "URL2." That location may be any location also accessible over the wide area network 101, such as on storage 132 which may reside at another server or on the same server as the requested resource 111. The discovery document 130 may include any information that describes, either generally or specifically, the requested resource. In addition, the discovery document 130 may identify another discovery document (not shown) that includes further metadata related to the requested resource 111. Although generally described here, the discovery document 130 is described in detail later in conjunction with FIG. 4.

The client computer 120 may be a conventional computing system including Web browsing software or the like. The client computer 120 is configured with components or modules that issue requests over the network 101 to retrieve resources from other sites connected to the network 101. In one example, the client computer 120 is configured to issue an HTTP GET command to retrieve a resource from a site connected to the network 101 and identified by a URL. The client computer 120 is also configured to evaluate information included in any response documents, such as response document 112, returned to the client computer 120. The client computer 120 evaluates response documents to determine whether the response documents include an identification of a discovery document 130. If so, the client computer 120 is also configured to retrieve and process the discovery document 130. Retrieving and processing the discovery document is described in detail below in conjunction with FIG. 4 and FIG. 6. Briefly stated, the client computer 120 determines from the response document 112 whether a discovery document 130 is identified, and if so, retrieves the discovery document from a URL provided in the response document 112. At that point, the client computer 120 may utilize or apply the metadata in any appropriate way, such as to facilitate communications between the client computer 120 and the server 102.

FIG. 2 is a graphical representation of a first illustrative type of response document (Response Document A 201) that may be returned in response to a request for a resource. In this example, Response Document A is of type HTML, such as may be returned in response to a request for an HTML-formatted Web page. As illustrated in FIG. 2, header information 203 in Response Document A identifies it as HTML text data. In addition, among other information and tags, Response Document A is annotated to identify a discovery document containing metadata about the resource. More specifically, Response Document A includes an indication that metadata may exist for the requested resource, and it provides a pointer (e.g., a URL) to that metadata.

In one specific implementation, Response Document A may include a special LINK tag 205 that is interpreted by the client computer 120 as an indication that there is metadata associated with the resource. For example, the following sample LINK tag 205 may be used: <LINK rel='alternate' type='text/xml' href='URL2'/>. In this case, the term "LINK" identifies the tag as a LINK tag, the phrase "rel='alternate'" indicates that the tag is an alternate type meaning that the client computer 120 may retrieve an alternate resource pointed to by the tag. In addition, the phrase "type='text/xml'" indicates the type of response that is expected when the pointed-to resource is retrieved. And finally, the phrase "href='URL2'" identifies a URL that points to the alternate resource. In this way, the response document itself indicates to the requesting computer that there is metadata available for the requested resource.

FIG. 3 is a graphical representation of a second illustrative type of response document (Response Document B 301) that may be returned in response to a request for a resource. In this example, Response Document B is of type XML (eXtensible Markup Language), such as may be returned in response to a request for a resource other than an HTML-formatted Web page. For example, information returned in response to a request issued to a Web service may be created and returned in XML format. Those familiar with XML will appreciate that an XML response document may be formatted as hierarchical elements. A MIME content-type 303 (or other indication) identifies the Response Document B as XML text. In addition, as with the HTML type of response document, Response Document B is annotated to indicate that there is metadata available related to the requested resource. More particularly, a special element may be used in Response Document B to indicate that metadata is available, and to include a pointer (e.g., a URL) to that metadata.

In one specific implementation, an XML stylesheet processing instruction 305 is included that operates to indicate that there is metadata associated with the resource. The XML stylesheet processing instruction 305 includes a URL to where the metadata may be found, "URL3" in this example. It also includes the phrase "type='text/xml'" which indicates XML text is expected in return to an access of the resource at the identified URL.

FIG. 4 is a graphical representation of an illustrative discovery document 401 that includes metadata about a requested resource. It has been described above that when a resource is requested, the response document returned to that request indicates that metadata is available about that resource. In this described embodiment of the invention, the metadata is included within an XML discovery document 401 which is pointed to in the response document. The discovery document 401 may include a top element type 403 that indicates the document is a discovery document.

There are nearly an unlimited number of ways that metadata within the discovery document 401 may be used when interacting with the requested resource. Likewise, the structure of the discovery document 401 may be arbitrary or tailored to suit particular purposes. It is envisioned that components or modules at the client computer 120 (or other requesting device) are configured to interpret the discovery document 401, such as to assist in communications between the client computer 120 and the server 102 (assuming that the client computer 120 issues a request for a resource 111 stored at the server 102). For example, a messaging component at the client computer 120 may use information in the discovery document 401 when formulating a structured message to be transmitted to the server 102. Many other uses for the metadata will become apparent to the skilled Web services artisans.

In a simple form, the discovery document 401 could simply contain text in XML format that describes information about the requested resource. However, in a more elaborate form, the discovery document 401 includes both information about the requested resource as well as links to additional information or other discovery documents that enhance the effectiveness of the metadata. To that end, the discovery document 401 may include typed-links that each address particular situations or types of information that may be useful for different purposes. In one specific implementation, four kinds of typed links are used: (1) a link to another discovery document, (2) a link to a service, (3) a link to service description, and (4) a link to an XML schema. Although four types of typed-links are described here, those skilled in the art will appreciate that this is not an exhaustive list and many other kinds of typed links may be employed to serve different purposes and to achieve other goals. The typed links presented here are for illustrative purposes only.

One type of link that may be included in the discovery document 401 is a link 405 to another discovery document. For example, a primary Web service may assemble functionality from two or more ancillary service providers. Each ancillary service provider may make its own discovery document available to the primary Web service. In that case, a discovery document returned by the primary Web service may include links to the discovery documents of the ancillary service providers. The discovery document link 405 may take the form: <d:discoveryRef ref='URL5' xmlns: d='http://xmlsoap.org/disco/'/>. In that case, the phrases "discoveryref" and "xmlns:d='http://xmlsoap.org/disco/'" together uniquely identify this element as a type that points to another discovery document. The phrase "ref='URL5'" indicates that the other discovery document may be found at the location pointed to by URL5.

Another type of link that may be included in the discovery document 401 identifies a link 407 to another service. For instance, continuing with the above example, a primary Web service (such as a financial service) may employ several support services (such as a stock quote service or a bill paying service). The service link 406 could be used to identify those other ancillary or support services. More specifically, a different service link 407 could be used to identify each support service. The service link 407 could take the following form: <q:soap address='URL6' binding='z:finance' xmlns:z='http://biz.org/standards xmlns:q='http://xmlsoap.org/disco/soap>. In that case, the phrases "q:soap" and "xmlns:q='http://xmlsoap.org/disco/soap" together identify the link as a type that identifies another service. The phrases "binding='z:finance'" and "xmlns:z='http://biz.org/standards" together identify the other service. And the phrase "address='URL6'" indicates that the service resides at the location pointed to by URL6.

Still another type of link that may be included in the discovery document 401 is a link 409 to a description of the service identified by the service link 406. The service description may be a document that describes a "contract" for the communication between a client computer and the service. One example of such a contract may be based on the Simple Object Access Protocol (SOAP) and describe the protocol for transmitting and receiving messages with the service. One example of such a service description link 409 takes the form <c:contractRef ref='URL7' docRef='URL8' xmlns:c='http://xmlsoap.org/disco/'/>. In this case, the phrases "c:contractRef" and "xmlns:c='http://xmlsoap.org/disco/'" together identify the link as being of the service description type. The phrase "ref='URL7'" indicates that a description document or contract for communicating with the described service may be found at the location pointed to by URL7. For instance, one specific implementation of such a service description may conform to the WSDL (Web Services Description Language). The optional phrase "docRef='URL8'" may be used to indicate that a human-readable document that describes the service may be found at the location pointed to by URL8. Although the service description link 409 may reside within the same discovery document 401 as the service link 407, the more likely case is that the service description link 409 will be found within a different discovery document 401 that may be returned in response to an attempt to access the service identified by the service link 407.

And yet another type of link that may be included in the discovery document 401 is an XML schema link 411. This type of link identifies an XML schema that may describe a grammar for particular messages that can be sent back and forth between a client computer and the service identified by the service link 407. The XML schema link can take the form: <e:schemaRef ref='URL9' xmlns:e='http://xmlsoap.org/disco/schema'/>, where the phrases "e:schemaRef" and "xmlns:e='http://xmlsoap.org/disco/schema'" together indicate that the link is of the XML schema type. The phrase "ref='URL9'" indicates that the XML schema may be found at the location pointed to by URL9. Again, as with the service description link, the XML schema link is more likely to be found in a discovery document returned in response to an access of the service identified by the service link 407.

Figure 5:
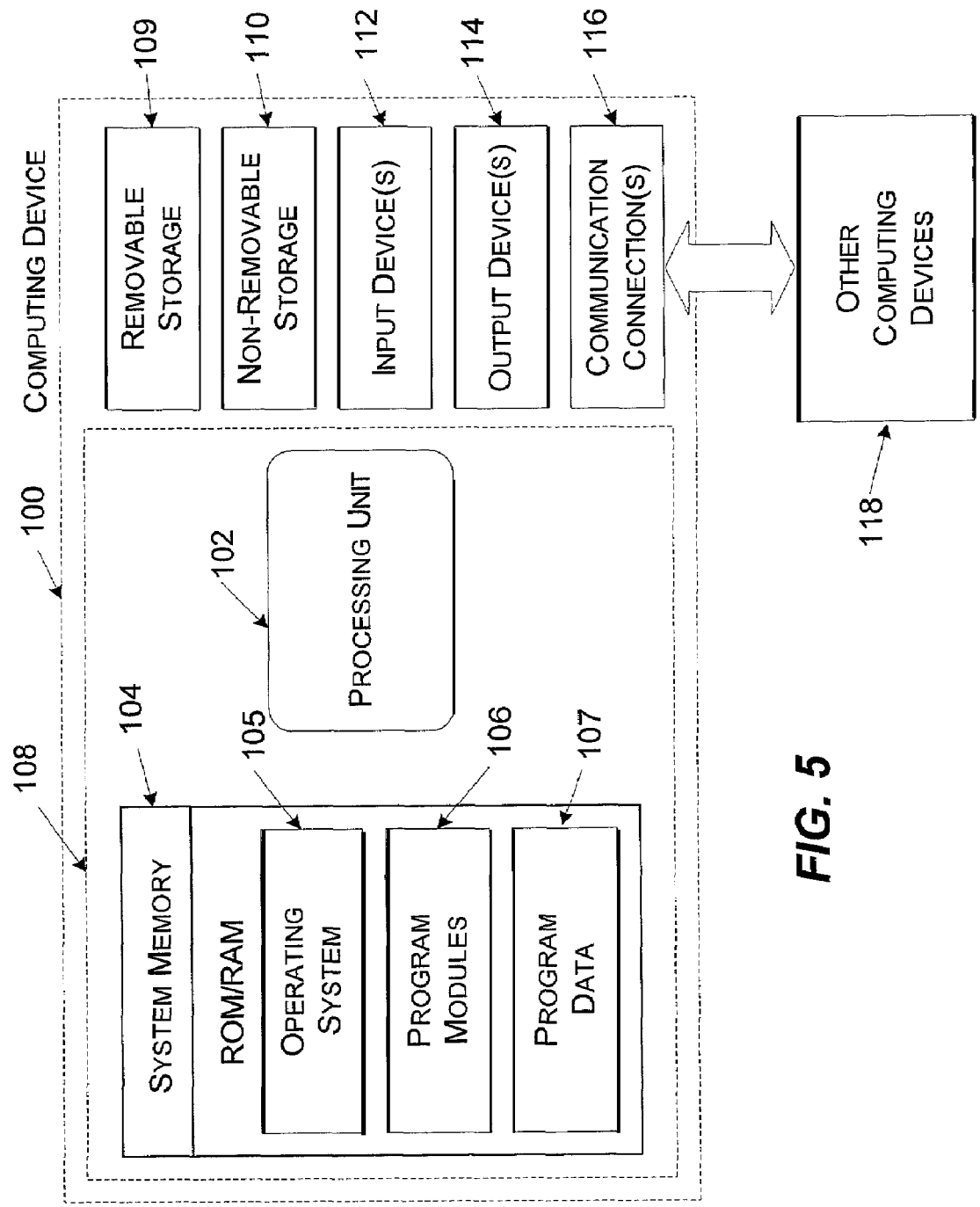
FIG. 5 is a functional block diagram generally illustrating one example of a computing device of the type that may be adapted to include components and modules implementing aspects of the present invention.

FIG. 5 shows an exemplary computing device that may be included in a system implementing the invention, according to one embodiment of the invention. The server 102 and the client computer 120 (FIG. 1) may be two examples of specific implementations of the computing device 500. In a very basic configuration, computing device 500 typically includes at least one processing unit 502 and system memory 504. Processing unit 502 includes existing physical processors, those in design, multiple processors acting together, virtual processors, and any other device or software program capable of interpreting binary executable instructions. Depending on the exact configuration and type of computing device, system memory 504 may be volatile (such as RAM), non-volatile (such as ROM, flash memory, etc.) or some combination of the two. System memory 504 typically includes an operating system 505, one or more program modules 506, and may include program data 507. This basic configuration is illustrated in FIG. 5 by those components within dashed line 508.

Computing device 500 may also have additional features or functionality. For example, computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and nonvolatile, removable and non-removable media implemented in any method or technology for storage of information, such as computer readable instructions, data structures, program modules or other data. System memory 504, removable storage 509 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard, mouse, pen, voice input device, touch input device, etc. Output device(s) 514 such as a display, speakers, printer, etc. may also be included. All these devices are known in the art and need not be discussed at length here.

Computing device 500 may also contain communications connection(s) 516 that allow the device to communicate with other computing devices 518, such as over a network. Communications connection(s) 516 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 6:
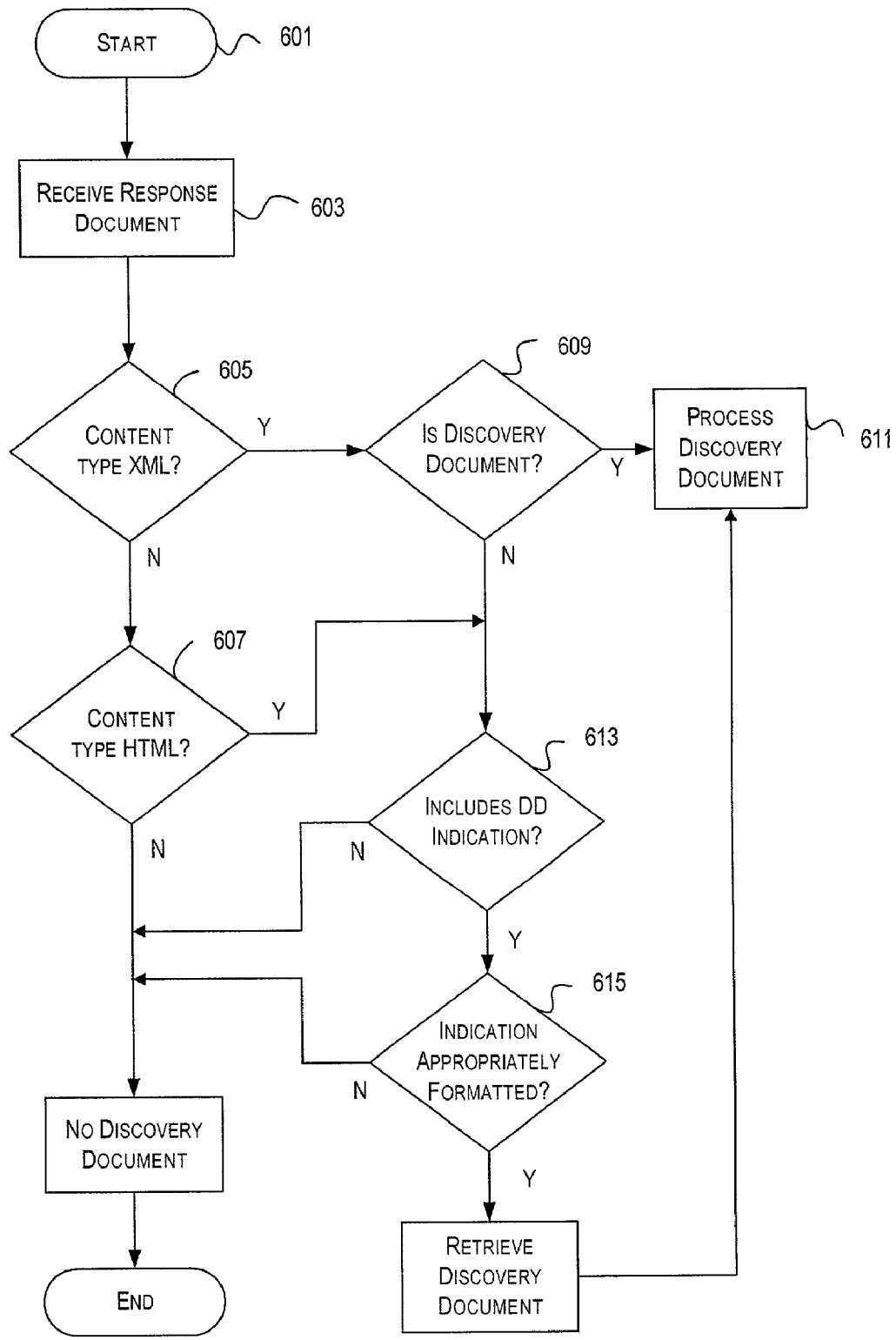
FIG. 6 is a logical flow diagram generally illustrating a process for discovering metadata information about a resource published at a Web site.

FIG. 6 is a logical flow diagram generally illustrating a process 600 for retrieving metadata about a resource in conjunction with a request to retrieve the resource. The process enters at starting block 601, where a client computer has requested access to a resource over the Web by issuing an HTTP GET command for the resource pointed to by a particular URL. The process 600 continues at block 603 where the client computer receives a document in response to the request.

At decision block 605, a determination is made whether a content type associated with the response document is of type text/xml. As described above, the response document may include header information, such as MIME data, that identifies the type of response document. If not, then the process proceeds to decision block 607 described below. If, however, the response document is of type text/xml, the process proceeds to decision block 609.

At decision block 609, a determination is made whether the response document is a discovery document, as that term has been described above. Briefly restating, the discovery document contains metadata that describes aspects of the requested resource. Again, the response document may include header information or a topmost element that identifies the XML response document as a discovery document. If so, then at block 611, the client computer processes the discovery document to extract and use the metadata as appropriate for the specific instance. For example, and referring briefly to FIG. 4, various informative metadata may be included in the discovery document that simply provides information about the requested resource. In addition, the discovery document may include typed links to other metadata information, such as support or ancillary services used in conjunction with the requested resource, other discovery documents, a description of other services, or an XML schema for messages to be communicated between the resource and the client computer.

Returning to decision block 609, if the response document is not a discovery document, or if the response document is of type text/html (block 607), the process proceeds to decision block 613, where a determination is made whether an appropriate indication exists that a discovery document exists and is referred to by the response document. The particular form of the indication depends on the type of response document that has been received (e.g., a LINK tag within an HTML document or an XML stylesheet processing instruction within an XML document). For example, if the response document is an XML document, and the XML document includes an XML stylesheet processing instruction, then that instruction, if certain attributes exist, may indicate the existence and location of a discovery document. Likewise, if the response document is an HTML document, and the HTML document includes a LINK tag having certain attributes, then that tag may indicate the existence and location of a discovery document. So, if no such appropriate indication exists in the response document, then the response document does not refer to a discovery document and the process ends.

If, however, at decision block 615, the appropriate indication (as identified in decision block 613) is of a proper format, then a discovery document is identified by the response document. For example, if the response document includes a LINK tag, and that tag includes the following attributes: type='text/xml', rel='alternate' and href="URL2", then that information may determine that the LINK tag identifies and points to a discovery document. Similarly, if the response document includes an XML stylesheet processing instruction that includes the following attributes: type='text/xml', alternate='yes', and href='URL2', then that information may determine that the XML stylesheet processing instruction identifies and points to a discovery document. In those cases, the client computer may perform an HTTP GET on the discovery document pointed to by URL2, and the process 600 may return to block 603 which performs again as described above. In accordance with the invention, the client computer may be configured to cause the discovery document to be retrieved automatically and without further user interaction.

Thus, in conclusion, the present invention describes a system and mechanism by which a client computer may issue a conventional request for a resource on the Web. A response to that request may be annotated with information indicating that metadata is available for the resource. Specifically, a special tag or instruction may be included in the response document that indicates the existence and location of a discovery document containing metadata about the resource. The client computer may then retrieve the metadata from the location identified in the response. Those skilled in the art will appreciate that the present invention enables a lightweight mechanism for discovering metadata about a resource without a need for extensive reprogramming of the resource or the addition of other resources specifically to indicate that metadata may exist for the resource.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for identifying metadata about a first resource identified by a first Uniform Resource Identifier ("URI"), the method comprising:
   issuing a request for the first resource identified by the first URI;
   receiving a response document from the first URI;
   parsing the response document received in response to the issued request, wherein the response document includes a second URI for accessing a second resource, wherein the response document includes an indication that metadata about the first resource exists on the second resource, wherein the indication indicates a metadata format;
   generating a request to retrieve the metadata from the second resource, wherein the generated request is formatted to support the metadata format identified by the indication; and
   retrieving the metadata from the second resource.

2. The computer-implemented method of claim 1, wherein the response document comprises an XML document and the indication comprises an XML processing instruction.

3. The computer-implemented method of claim 2, wherein the indication further comprises an attribute identifying an "alternate" relation.

4. The computer-implemented method of claim 2, wherein the indication further comprises the second URI.

5. The computer-implemented method of claim 1, wherein the response document comprises an HTML document and the indication comprises a LINK tag.

6. The computer-implemented method of claim 5, wherein the LINK tag further comprises an attribute identifying an expected response type of text/xml.

7. The computer-implemented method of claim 5, wherein the LINK tag further comprises an attribute identifying an "alternate" relation.

8. The computer-implemented method of claim 5, wherein the LINK tag further comprises the second URI.

9. The computer-implemented method of claim 1, wherein retrieving the metadata from the second resource occurs automatically and without further user interaction.

10. A computer-readable medium having computer-executable instructions for identifying metadata about a first resource identified by a first Uniform Resource Locator "URI", the instructions comprising:
    issuing a request for a first resource identified by a first URI associated with the request;
    receiving a response document from the first URI;
    parsing the response document received in response to the issued request, wherein the response document includes a second URI for retrieving a discovery document, wherein the response document includes an indication that metadata about the first resource is associated with the discovery document;
    using the second URI to generate a request to retrieve the discovery document from the second resource; and
    retrieving the discovery document from the second resource, wherein the discovery document includes a link that indicates the existence of further metadata about the first resource.

11. The computer-readable medium of claim 10, wherein the link indicates the existence of a second discovery document and a location of the second discovery document.

12. The computer-readable medium of claim 10, wherein the link indicates a link to a Web-based service.

13. The computer-readable medium of claim 12, wherein another link indicates a link to a description of the Web-based service.

14. The computer-readable medium of claim 10, wherein the link indicates a link to an XML schema.

15. A computer-readable medium having computer executable instructions for identifying metadata about a first resource identified by a first Uniform Resource Identifier "URI", the instructions comprising:
    issuing a response document in response to a request for a resource at a first location identified by a first URI, wherein the response document includes a second URI for accessing a second resource, wherein the response document includes an indication that metadata about the first resource exists on the second resource, wherein the indication indicates a metadata format; and
    issuing a request to retrieve the metadata from the second resource, wherein the request to retrieve the metadata is formatted to support the metadata format identified by the indication.

16. The computer-readable medium of claim 15, wherein the response document is an HTML document and the indication comprises a LINK tag.

17. The computer-readable medium of claim 15, wherein the response document is an XML document and the indication comprises an XML stylesheet processing instruction.

18. A system for communicating data over a network, the system comprising:
    a processor; and
    a memory having computer-executable instructions stored thereon, the computer-executable instructions being configured to:
       issue a request for a first resource identified by a first Uniform Resource Indicator "URI" associated with the request;

receive a response document from the first URI;

parse the response document received in response to the issued request, wherein the response document includes a second URI for accessing a second resource, wherein the response document includes an indication that metadata about the first resource exists on the second resource;

generate a request to retrieve the metadata from the second resource; and retrieve the metadata from the second resource.

19. The system of claim 18, wherein the response document comprises an XML document and the indication comprises an XML stylesheet processing instruction.

20. The system of claim 18, wherein the response document comprises an HTML document and the indication comprises a LINK tag.

21. A computer-implemented method for obtaining metadata about a first web service, the method comprising:

issuing a request for a first web Service, wherein the first web service is associated with a first Uniform Resource Indicator "URI";

receiving a response document from the first URI in response to the request, wherein the response document includes a second URI for accessing a second web service, wherein the response document includes an indication that metadata about the first web service exists on the second web service; and using the second URI to obtain the metadata from the second web service.

* * * * *